(12) United States Patent
Takasaki et al.

(10) Patent No.: US 10,379,405 B2
(45) Date of Patent: Aug. 13, 2019

(54) DISPLAY DEVICE

(71) Applicant: Japan Display Inc., Minato-ku (JP)

(72) Inventors: Ryota Takasaki, Minato-ku (JP);
Yusuke Morita, Minato-ku (JP);
Hirofumi Funakoshi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 50 days.

(21) Appl. No.: 15/589,456

(22) Filed: May 8, 2017

(65) Prior Publication Data
US 2017/0336666 A1    Nov. 23, 2017

(30) Foreign Application Priority Data

May 18, 2016    (JP) ................................ 2016-099665

(51) Int. Cl.
| | | |
|---|---|---|
| *G02F 1/1333* | (2006.01) | |
| *G02F 1/1335* | (2006.01) | |
| *G02F 1/1339* | (2006.01) | |
| *G02F 1/1362* | (2006.01) | |

(52) U.S. Cl.
CPC ........ *G02F 1/13394* (2013.01); *G02F 1/1339* (2013.01); *G02F 1/133512* (2013.01); *G02F 1/133514* (2013.01); *G02F 2001/133388* (2013.01); *G02F 2001/133519* (2013.01); *G02F 2001/136295* (2013.01)

(58) Field of Classification Search
CPC .............. G02F 1/13394; G02F 1/1339; G02F 2001/133388; G02F 1/133514
See application file for complete search history.

(56) References Cited

U.S. PATENT DOCUMENTS

| | | | | |
|---|---|---|---|---|
| 2003/0025868 A1* | 2/2003 | Hiroshima | .......... | G02F 1/13394 349/156 |
| 2003/0137631 A1* | 7/2003 | Nakayoshi | ............ | G02F 1/1333 349/155 |
| 2012/0169977 A1* | 7/2012 | Tsubata | .................. | G02B 5/201 349/106 |
| 2013/0050619 A1* | 2/2013 | Kim | .................... | G02F 1/13394 349/106 |
| 2014/0307208 A1* | 10/2014 | Hatakeyama | ....... | G02F 1/13394 349/106 |
| 2015/0346556 A1 | 12/2015 | Hirota et al. | | |

FOREIGN PATENT DOCUMENTS

JP    2015-225227    12/2015

* cited by examiner

*Primary Examiner* — Jessica M Merlin
(74) *Attorney, Agent, or Firm* — Oblon, McClelland, Maier & Neustadt, L.L.P.

(57) ABSTRACT

A liquid crystal display device includes a counter substrate having a glass substrate, a color layer on the glass substrate, an overcoating layer on the color layer, and a counter protrusion and a counter wall protrusion on the overcoating layer. The counter protrusion is located in an image display region. The counter wall protrusion is located in a peripheral region enclosing the image display region. The counter protrusion and the counter wall protrusion are of substantially a same height. A first protrusion distance from the glass substrate to a top of the counter protrusion is shorter than a second protrusion distance from the glass substrate to a top of the counter wall protrusion. According to the liquid crystal display device configured as above, an outer periphery of a display panel does not bend.

8 Claims, 18 Drawing Sheets

FIG. 9
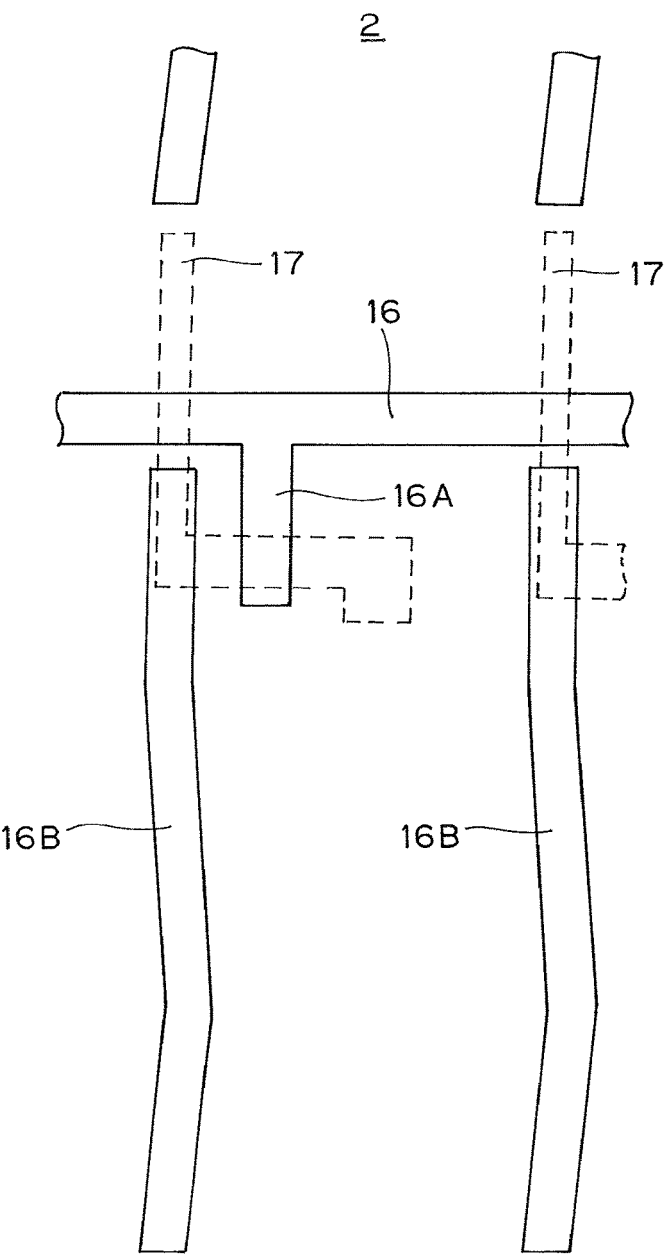
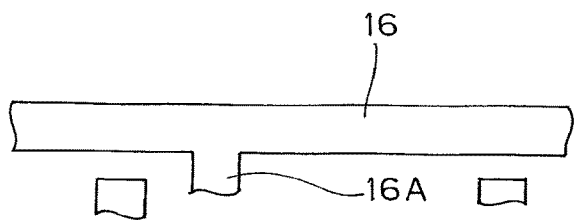

DISPLAY DEVICE

CROSS-REFERENCE TO RELATED APPLICATION

This application is based upon and claims the benefit of priority from the prior Japanese Patent Application No. 2016-99665, filed on May 18, 2016; the entire contents of which are incorporated herein by reference.

FIELD

Embodiments described herein relate generally to a display device.

BACKGROUND

A display panel of a liquid crystal display device in the related art includes an array substrate, a counter substrate, a liquid crystal layer held in a clearance between the two substrates, and a seal member sealing the liquid crystal layer by laminating the two substrates along peripheries. In a liquid crystal display device in recent years, a spacer is provided to an outer periphery of the seal member to prevent the seal member from coming out to an outer periphery of the display panel.

A spacer is provided not only to the outer periphery of the seal member, but a spacer to maintain an interval of the liquid crystal layer constant is also provided to an image display region of the display panel. The liquid crystal display device configured as above, however, has a problem that the outer periphery of the display panel bends more than the image display region unless the spacer in the image display region and the spacer in the outer periphery are of a same height.

In view of the foregoing problem, an object of embodiments described herein is to provide a liquid crystal display device, in which an outer periphery of a display panel does not bend.

BRIEF DESCRIPTION OF THE DRAWINGS

FIG. 9 is a plan view of the array substrate in a first step;

DETAILED DESCRIPTION

Figure 1:
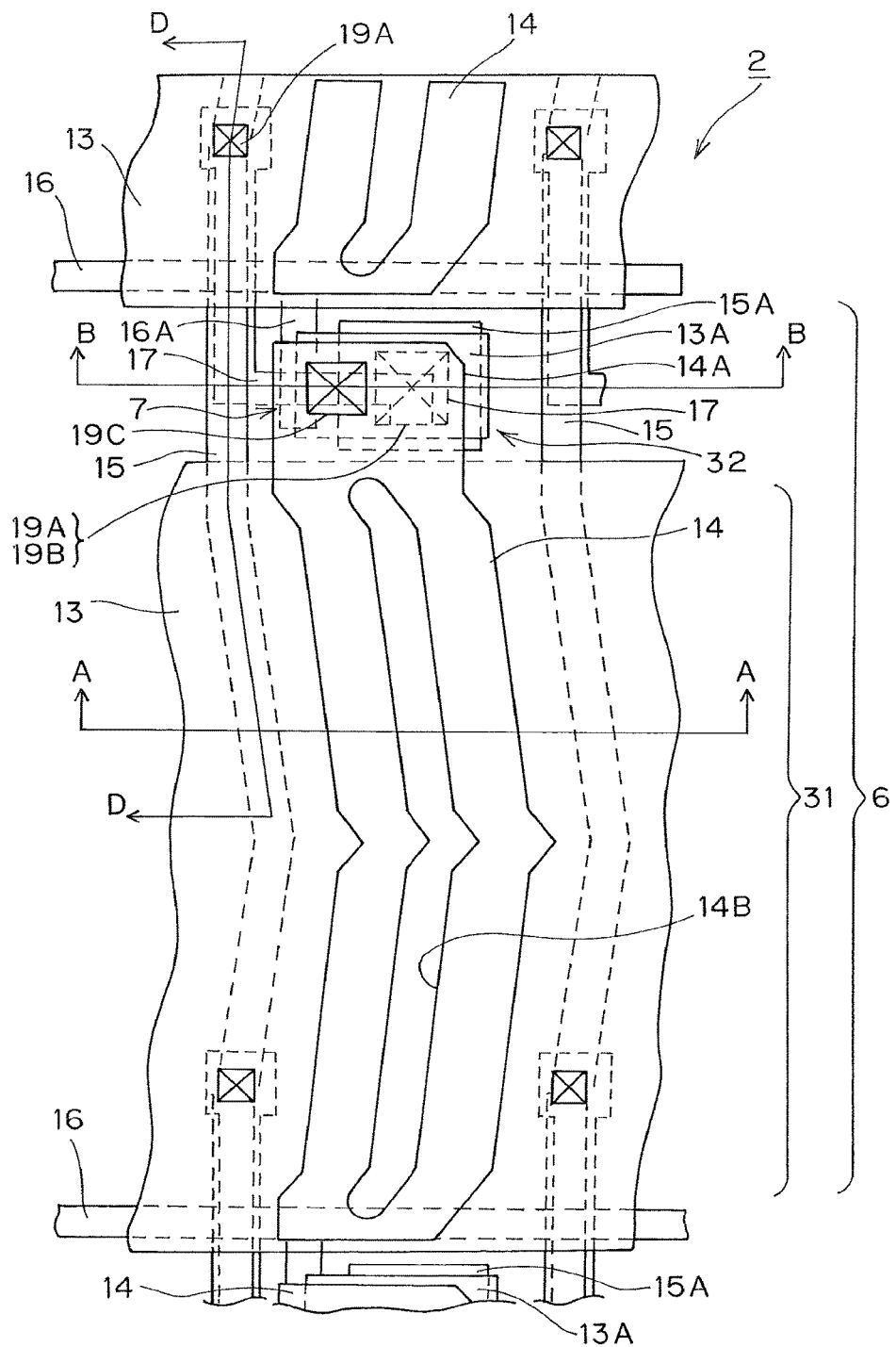
FIG. 1 is an enlarged plan view of one pixel in a display panel of a liquid crystal display device according to a first embodiment.

According to embodiments, a display device includes a counter substrate including a first insulation substrate, a color layer on the first insulation substrate, an overcoating layer on the color layer, and a first protrusion and a second protrusion on the overcoating layer. The first protrusion is located in an image display region and the second protrusion is located in a peripheral region enclosing the image display region. The first protrusion and the second protrusion are of substantially a same height. A first protrusion distance from the first insulation substrate to a top of the first protrusion is shorter than a second protrusion distance from the first insulation substrate to a top of the second protrusion.

Also, a liquid crystal display device includes an array substrate including a second insulation substrate, a metal line on the second insulation substrate, a first insulation film covering the metal line, an image display region, a peripheral region enclosing the image display region, a third protrusion in the image display region, and a fourth protrusion in the peripheral region. The fourth protrusion is provided in a vicinity of an outer end of the array substrate. A third protrusion distance from the second insulation substrate to a top of the third protrusion and a fourth protrusion distance from the second insulation substrate to a top of the fourth protrusion are substantially equal.

Liquid crystal display devices according to the embodiments will be described with reference to the drawings. It should be appreciated that a disclosure by the embodiments below is a mere example and modifications readily achieved as needed by anyone skilled in the art in line with the spirit of the invention are within the scope of the present invention. Respective elements may be shown in the drawings in schematic representation in width, thickness, and shape rather than in faithful representation for ease of clear description and such representations are a mere example and have no intention to limit an interpretation of the present invention. In the specification and respective drawings, elements same as elements described earlier with reference to any drawing are labelled with same reference numerals and a detailed description may be omitted where appropriate.

A liquid crystal display device of the embodiments in a concrete example is of a horizontal field type called an IPS (In-Plane Switching) method, in particular, an FFS (Fringe Field Switching) method using a fringe field as an example of the IPS method.

First Embodiment

A liquid crystal display device of a first embodiment will be described with reference to FIG. 1 through FIG. 12.

1. Overall Configuration of Display Panel 1

A display panel 1 of a liquid crystal display device includes an array substrate 2, a counter substrate 3, a liquid crystal layer 4 held in a clearance between the two substrates 2 and 3, and a seal member 5 sealing the liquid crystal layer 4 by laminating the two substrates 2 and 3 along outer peripheries. The display panel 1 includes an image display region where an image is displayed and a peripheral region enclosing the image display region.

2. Array Substrate 2

Figure 7:
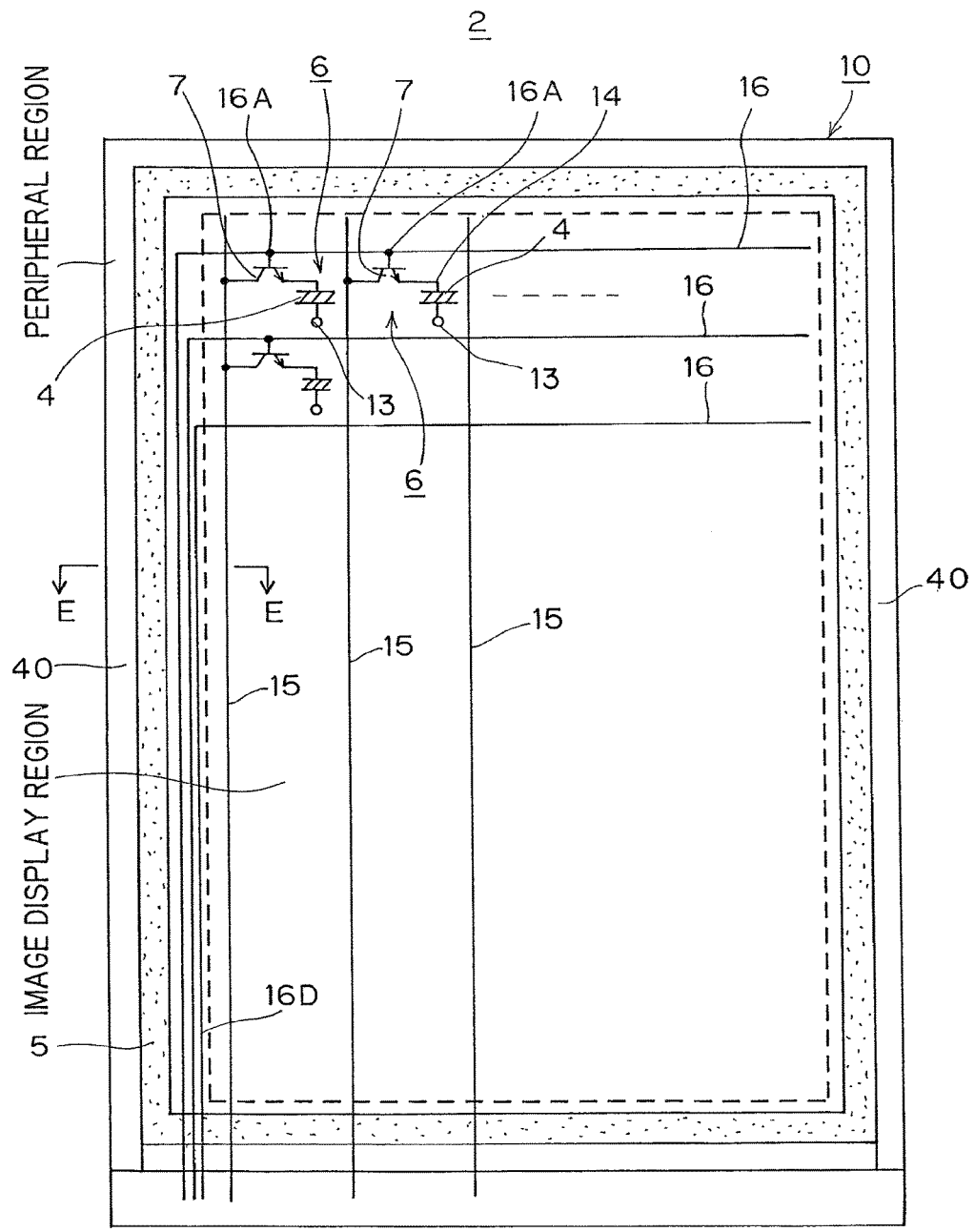
FIG. 7 is a plan view of the array substrate.

The array substrate 2 will be described with reference to FIG. 1, FIG. 3 through FIG. 5, FIG. 7, and FIG. 9. As is shown in FIG. 7, signal lines 15 in a vertical direction and gate lines 16 in a horizontal direction are arrayed in a grid in the image display region of a glass substrate 10 of the array substrate 2 and a pixel 6 is provided at every intersection. The pixel 6 has an n-channel or a p-channel TFT (Thin Film Transistor) 7 as a switching device and a pixel electrode 14. In a switching element 32 of the pixel 6, the gate line 16 is connected to a gate electrode, the signal line 15 is connected to a source electrode, and a drain electrode is connected to the pixel electrode 14. As is shown in FIG. 1, the pixel 6 extends long along a direction of the signal lines 15. Most of a region in a longitudinal direction corresponds to a pixel opening 31, in which is disposed the pixel electrode 14 having a slit 14B. Disposed in the switching element 32 is a pixel electrode extension 14A provided at one end of the pixel 6 and extending from the pixel electrode 14.

Polysilicon wirings 17 forming semiconductors of the TFTs 7 are provided on a top surface of the glass substrate 10 of the array substrate 2 and a gate insulation film 16C is provided on the polysilicon wirings 17. The gate lines 16 are provided parallel to each other in the horizontal direction at regular intervals on the gate insulation film 16C. A gate electrode branch line 16A to be connected to the TFT 7 extends in the vertical direction from the gate electrode 16 at a position corresponding to the switching element 32. As is shown in FIG. 9, at a position corresponding to the signal line 15 in the vertical direction, which is a direction orthogonal to the gate line 16 in the horizontal direction, a first metal line 16B is provided in the vertical direction along the signal line 15. The first metal line 16B is a metal segment floated from other conductive layers and made of a same material and provided in a same layer as the gate line 16 with an aim to increase a height of an array protrusion 11 described below. As is shown in FIG. 7, at an end of each gate line 16 in the horizontal direction and in a peripheral region of the array substrate 2, a gate extraction line 16D continuing from the gate line 16 is provided in the vertical direction and extends to one side of the peripheral region of FIG. 8 where a three-sided counter protrusion 124 is absent. The one side is a region where a terminal of the array substrate 2 is provided.

Figure 3:
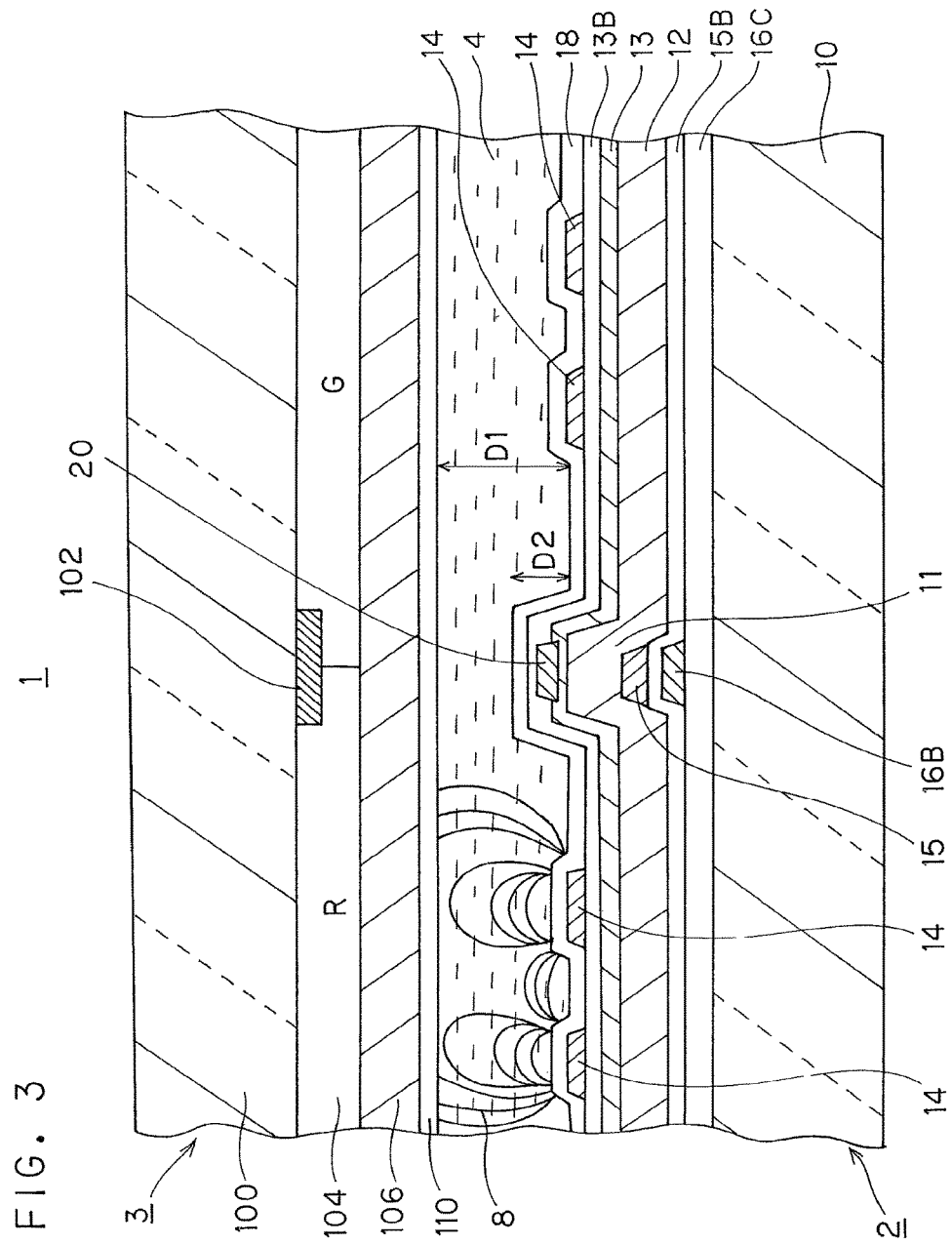
FIG. 3 is a sectional view taken along the line A-A of FIG. 1.

As is shown in FIG. 3, the array substrate 2 is provided with an organic insulation film 12 made of resin. The pixel electrodes 14 are disposed on the organic insulation film 12. The signal line 15 and a neighborhood are thickly covered with the organic insulation film 12 made of resin to form the array protrusion 11. The organic insulation film 12 in the array protrusion 11 is a dimension D2 (FIG. 3) higher than the organic insulation film 12 inside the pixel opening 31. The array protrusion 11 is provided continuously to sandwich the pixel opening 31 that is long along a direction of the signal line 15 from right and left.

A common electrode 13 made of a transparent conductive material, such as ITO and IZO, is provided on the organic insulation film 12 in the array protrusion 11.

A common line 20, which is a third metal line, is provided above the signal line 15 and on the common electrode 13 in the array protrusion 11. The common electrodes 13 are electrically interconnected via the common lines 20.

Figure 4:
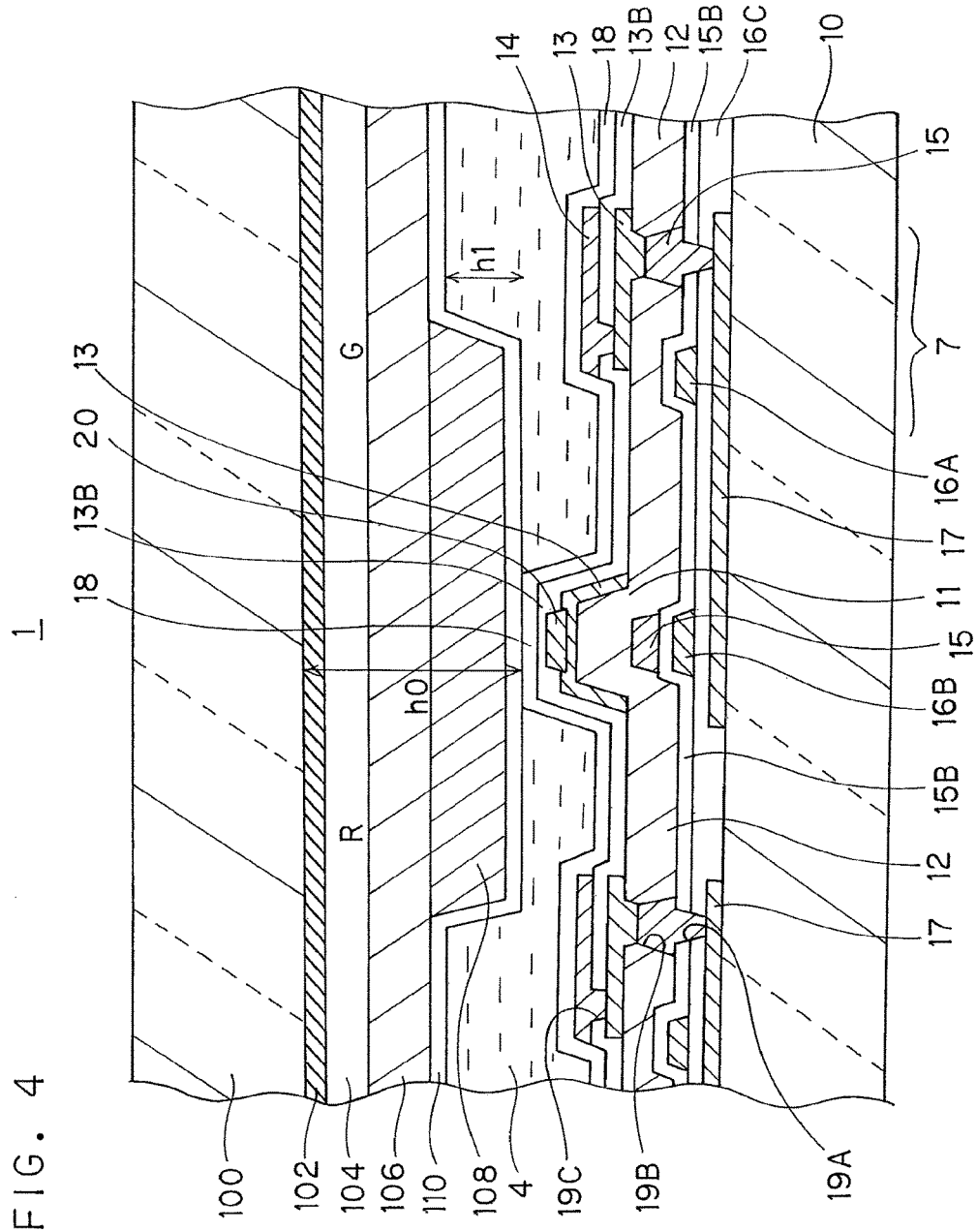
FIG. 4 is a sectional view taken along the line B-B of FIG. 1.
Figure 5:
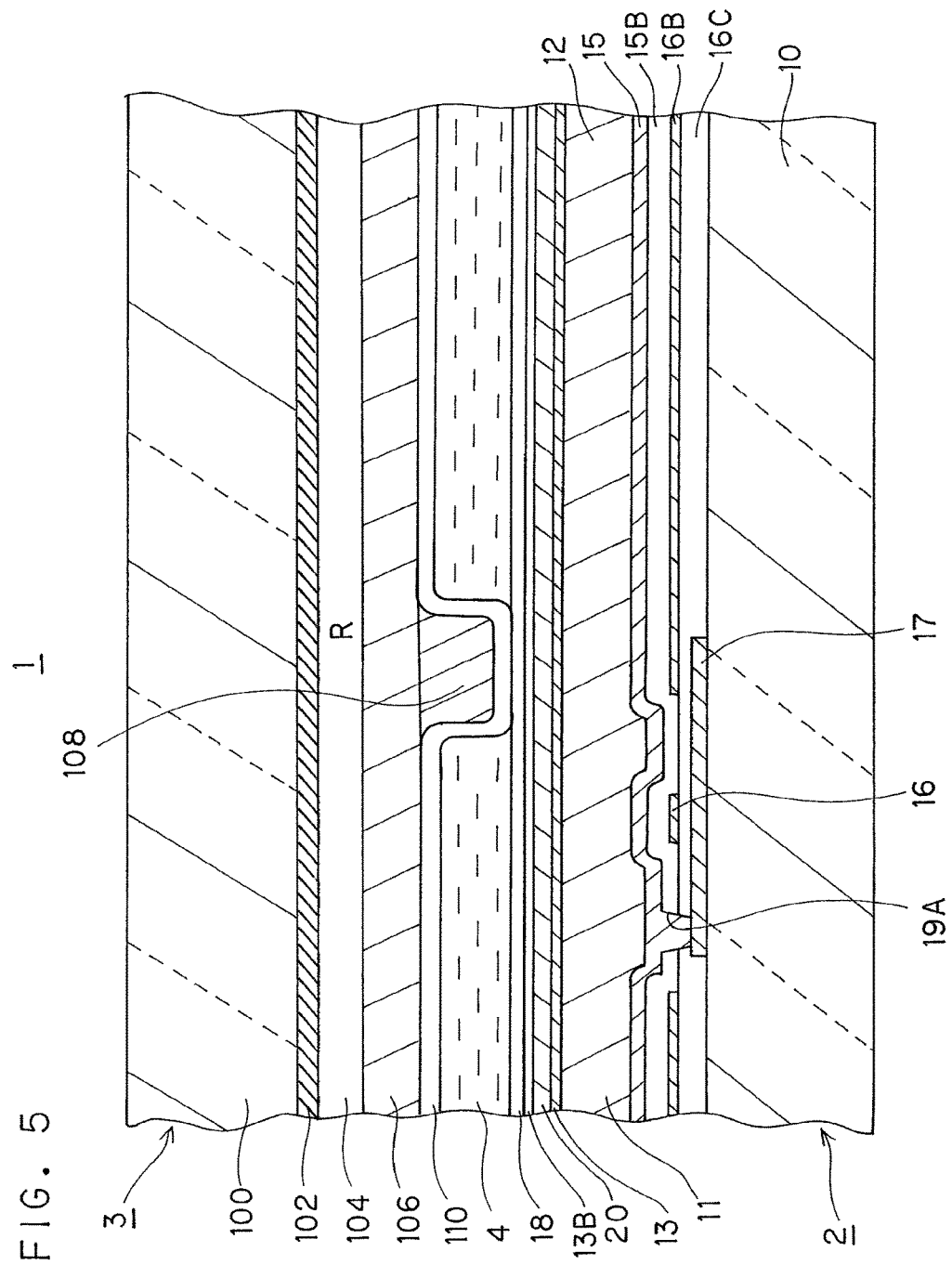
FIG. 5 is a sectional view taken along the line D-D of FIG. 1.

As are shown in FIG. 3 through FIG. 5, an oriented film 18 is provided to the array substrate 2 on a surface in contact with the liquid crystal layer 4. The oriented film 18 may be a horizontally oriented film or a perpendicularly oriented film treated by rubbing or photo-alignment.

The array protrusion 11 will be described more in detail. The organic insulation film 12 in the array protrusion 11 is provided higher than the organic insulation film 12 inside the pixel opening 31 and extends along the direction of the signal line 15. As is shown in FIG. 4, the array protrusion 11 includes the polysilicon wiring 17 provided on the glass substrate 10, the gate insulation film 16C, the first metal line 16B, a first interlayer insulation film 15B, the signal line 15, the organic insulation film 12, the common electrode 13, the common line 20, a second interlayer insulation film 13B, and the oriented film 18, which are sequentially provided one on another. The array protrusion 11 is the dimension D2 higher than the organic insulation film 12 in the other locations. The first inter-layer insulation film 15B and the second interlayer insulation film 13B are made of, for example, an inorganic material.

3. Counter Substrate 3

Figure 2:
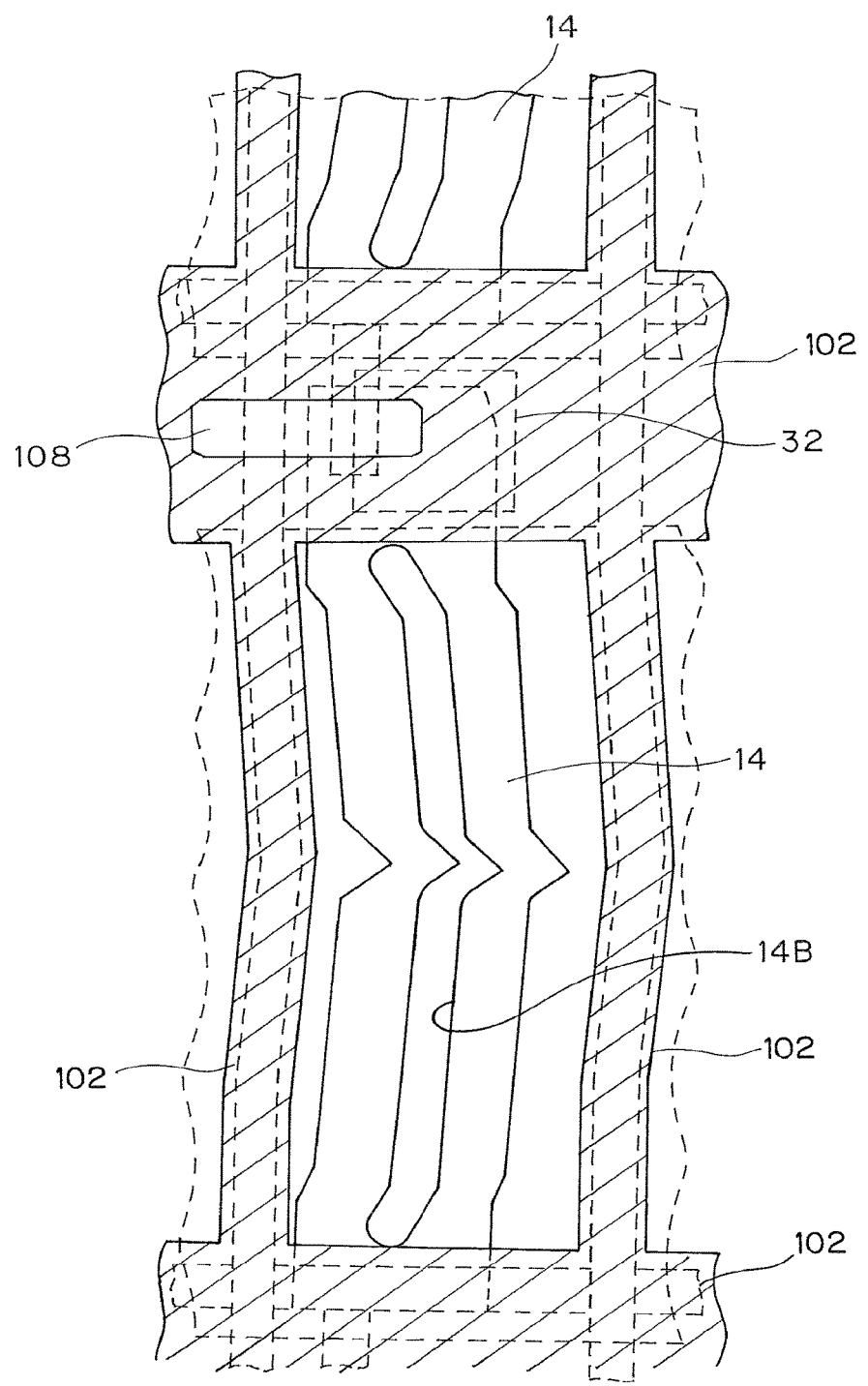
FIG. 2 is a plan view of an array substrate with a black matrix and a counter protrusion.

The counter substrate 3 will be described with reference to FIG. 2 and FIG. 3. A glass substrate 100 of the counter substrate 3 is provided with a grid-like black matrix 102 made of a black resin material. As is shown in FIG. 2, the black matrix 102 includes a vertical segment extending along the signal lines 15 to cover the signal lines 15 and a neighborhood and a horizontal segment covering the respective switching elements 32 and a neighborhood. In an example shown in FIG. 2, the horizontal segment covering the switching elements 32 and the neighborhood extends continuously along the gate lines 16 and forms a grid with the vertical segment covering the signal lines 15 and the neighborhood. Each opening of the grid-like black matrix 102 corresponds to the pixel opening 31.

As is shown in FIG. 3, a color filter layer 104 of R (Red), G (Green), or B (Blue) is provided on the black matrix 102.

An overcoating layer 106 made of resin is provided on the color filter layer 104.

The counter substrate 3 includes a counter protrusion 108. The counter protrusion 108 is made of a material different from the material of the overcoating layer 106. The counter protrusion 108 may be provided integrally with the overcoating layer 106 when the overcoating layer 106 made of resin is provided. As is shown in a plan view of FIG. 2, the counter protrusion 108 is of an oblong shape along the gate line 16 with rounded corners and provided from the signal line 15 to the switching element 32.

Figure 6:
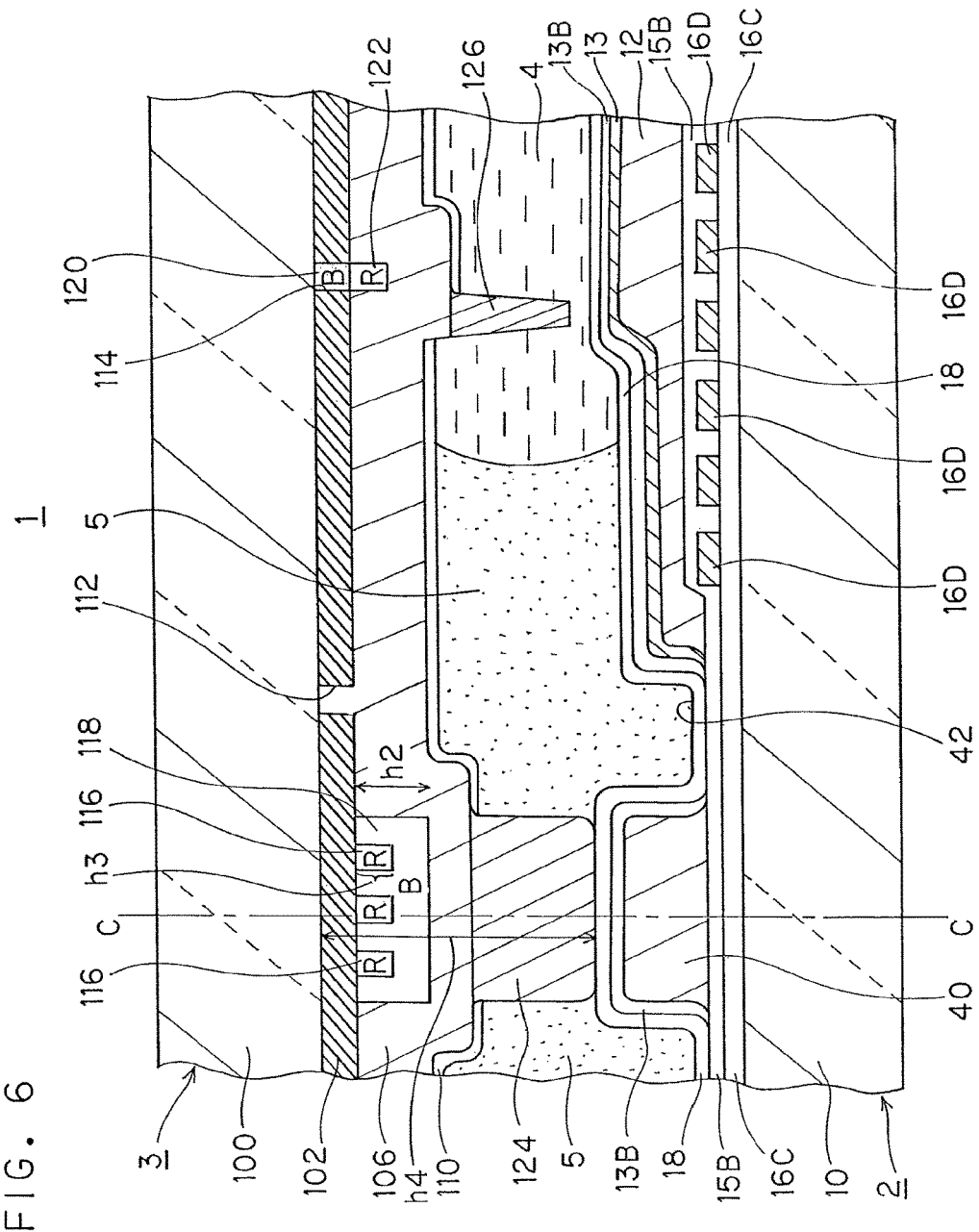
FIG. 6 is a longitudinal sectional view of an outer periphery of the display panel and corresponds to a sectional view taken along the line E-E of FIG. 7 and a sectional view taken along the line F-F of FIG. 8.

As is shown in FIG. 6, an oriented film 110 is provided to the counter substrate 3 on a surface in contact with the liquid crystal layer 4.

4. Spacer

As are shown in FIG. 2 through FIG. 4, a top of the array protrusion 11 and a top of the counter protrusion 108 make contact with each other and function as a spacer (photospacer). More specifically, a single spacer is formed by combining the array protrusion 11 extending along the signal line 15 in the vertical direction and the counter protrusion 108 extending along the gate line 16 in the horizontal direction in a cross shape.

The spacer formed in the manner as above can be provided for every certain number of the pixels 6. For example, one spacer can be provided for every four pixels 6 or one spacer can be provided for every eight pixels 6.

As are shown in FIG. 2 through FIG. 4, a thickness D1 of the liquid crystal layer 4 can be maintained by the pillar-like spacer formed of the array protrusion 11 and the counter protrusion 108.

5. Peripheral Region of Display Panel 1

Figure 8:
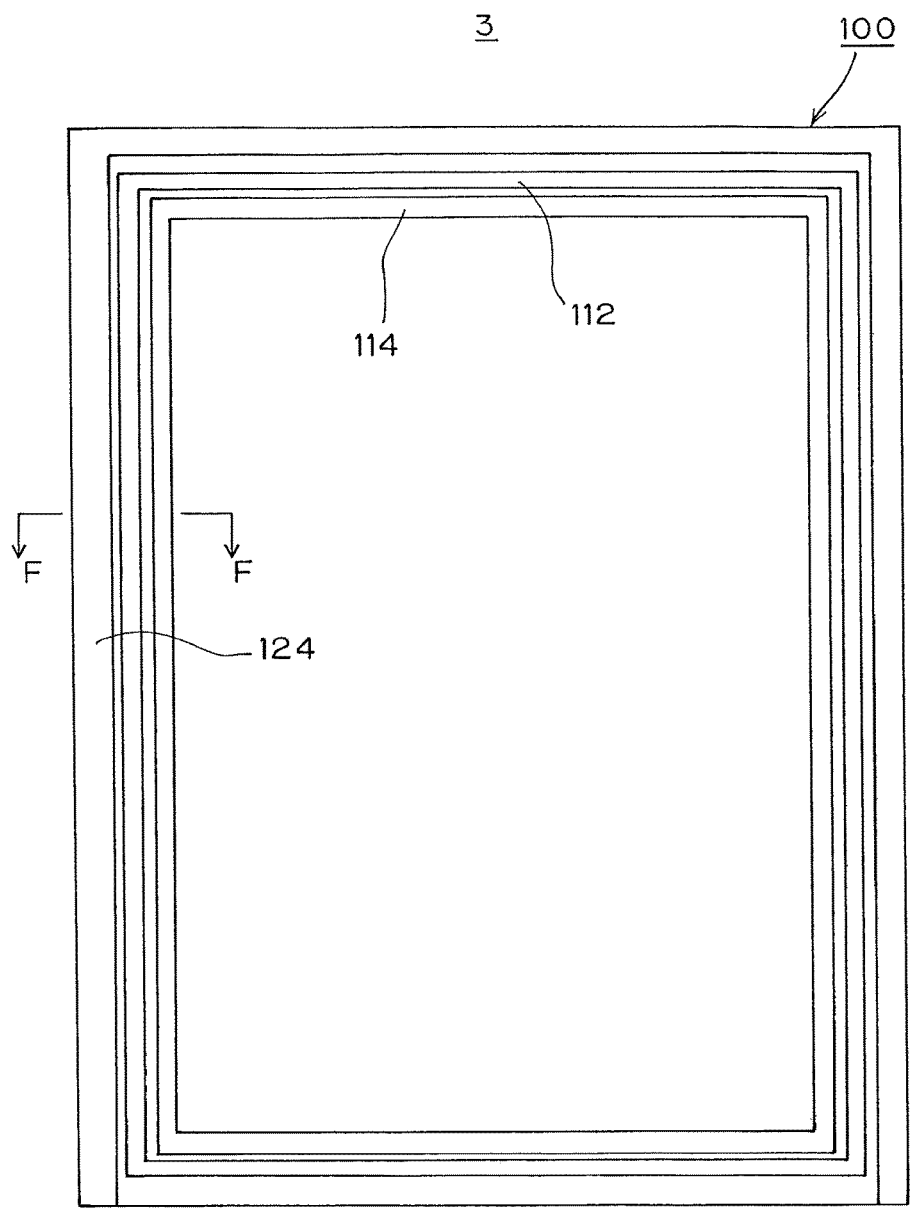
FIG. 8 is a bottom view of a counter substrate.

The peripheral region of the display panel 1 will now be described with reference to FIG. 6 through FIG. 8. FIG. 6 is a longitudinal sectional view before a large-scale glass substrate is cut into individual display panels 1. A single display panel 1 is manufactured by cutting the large-scale glass substrate in the vertical direction along a cut line C-C of FIG. 6.

Firstly, the peripheral region of the array substrate 2 will be described. As is shown in FIG. 7, a linear array wall protrusion 40 is provided along three sides of the outer periphery of the array substrate 2. A three-sided linear surrounding groove 42 is provided on the inner side of the array wall protrusion 40, that is, on the image display region side. As is shown in FIG. 6, the array wall protrusion 40 includes the gate insulation film 16C provided on the glass substrate 10, the first interlayer insulation film 15B, and the organic insulation film 12 of a predetermined height. The second interlayer insulation film 13B and the oriented film 18 are sequentially laminated on the organic insulation film 12. In addition, a region of the surrounding groove 42 includes the gate insulation film 16C provided on the glass substrate 10 and the first inter-layer insulation film 15B. In short, the surrounding groove 42 is lowered from the array wall protrusion 40 by a height of the organic insulation film 12 and therefore has a step.

A peripheral region of the counter substrate 3 will now be described. The black matrix 102 is provided to an outer periphery of the glass substrate 100 and the three-sided linear counter wall protrusion 124 is provided in an outer end. A first black matrix groove (hereinafter, referred to simply as the first BM groove) 112 is provided linearly along four sides in the outer periphery and on the inner side of the counter wall protrusion 124. A second black matrix groove (hereinafter, referred to simply as the second BM groove) 114 is also provided along four sides on the inner side of the first IBM groove 112, that is, on the image display region side.

As is shown in FIG. 6, a first wall color filter layer 116 is provided on the black matrix 102 corresponding to the counter wall protrusion 124. The first wall color filter layer 116 has one color (for example, red represented by R) and is provided along three sides. The first wall color filter layer 116 is provided with multiple slits each extending along the outer periphery and therefore has steps.

As is shown in FIG. 6, a second wall color filter layer 118 is provided on the first wall color filter layer 116. The second wall color filter layer 118 has a color (for example, blue represented by B) different from the color (red represented by R) of the first wall color filter layer 116. The second wall color filter layer 118 is laminated to fully cover the first wall color filter layer 116 while allowing a pigment to get into the slits generated by the steps. Hence, a height h2 of the second wall color filter layer 118 at this position becomes greater than a height h3 of the first wall color filter layer 116, but less than a height of simply laminated two color filter layers.

That is, the second wall color filter layer 118 becomes lower by a quantity comparable to an amount of the pigment getting into the slits. For example, given that a height of one color filter layer is 2.5 µm, then a total height is 5.0 µm when two color filer layers are simply laminated. However, by providing the slits to the first wall color filter layer 116 in the manner as descried above, the second wall color filter layer 118 can be 0.8 µm lower.

No color filer layer is provided inside the first BM groove 112. Two light-shielding color filter layers 120 and 122 are provided inside the second BM groove 114.

The overcoating layer 106 is provided on the first wall color filter layer 116 and the second wall color filter layer 118 provided in the manner as above, and the counter wall protrusion 124 is provided on the overcoating layer 106. More specifically, the three-sided counter wall protrusion 124 is provided along an outer peripheral end of the counter substrate 3 while the overcoating layer 106 and the counter protrusion 108 are provided in the image display region. The three-sided counter wall protrusion 124 is narrower than the counter protrusion 108. In addition, when the counter wall protrusion 124 is provided, an intrusion prevention wall 126 preventing intrusion of the seal member 5 into the image display region is also provided along four sides rather on the inner side of the seal member 5. The three-sided counter wall protrusion 124 and the counter protrusion 108 in the image display region are of a same height. However, the counter wall protrusion 124 is provided at a position where the first wall color filter layer 116 and the second wall color filter layer 118 are laminated. Hence, even when the two protrusions 124 and 108 are of a same height, the three-sided counter wall protrusion 124 protrudes downward more than the other protrusion 108 by a quantity comparable to the laminated two layers 116 and 118. It should be noted, however, that when two color filter layers are simply laminated, a downward protrusion becomes too long. Hence, by providing the slits to the first wall color filter layer 116 to allow a pigment of the second wall color filter layer 118 to get into the slits, a downward protrusion length is reduced by a quantity comparable to an amount of the pigment getting into the slits. In one example, a protrusion dimension can be reduced by 0.8 µm by providing the slits to the first wall color filter layer 116. A protrusion distance from the glass substrate 100 to the top of the counter wall protrusion 124 is, for example, 4.2 µm.

As is shown in FIG. 6, the three-sided counter wall protrusion 124 is disposed on the three-sided array wall protrusion 40 and the seal member 5 is provided on the inner side by laminating the array substrate 2 and the counter substrate 3. Further, the intrusion prevention wall 126 is located on the inner side of the seal member 5. When the large-scale substrate is cut along the line C-C, an end side surface of the glass substrate 100, an end side surface of the black matrix 102, an end side surface of the counter wall protrusion 124, an end side surface of the first wall color filter layer 116 and an end side surface of the second wall color filter layer 118 in the counter wall protrusion 124, and an end side surface of the counter wall protrusion 124 are flush with one another.

The light-shielding color filter layer 120 is located in the second BM groove 114 and the light-shielding color filter layer 122 is laminated on the light-shielding color filter layer 120. Herein, a distance from the glass substrate 100 to the overcoating layer 106 in a region where the second BM groove 114 is provided is shorter than a distance from the glass substrate 100 to the overcoating layer 106 in a region where the counter wall protrusion 124 is provided. A height of the intrusion prevention wall 126 provided along the four sides may be either same as or different from a height of the counter wall protrusion 124 and the counter protrusion 108.

A height of the laminated two color filter layers 116 and 118 can be adjusted to a target height by adjusting a slit width and the number of the first wall color filter layers 116.

6. Manufacturing Process of Array Substrate 2

A manufacturing process of the array substrate 2 will be briefly described with reference to FIG. 9 through FIG. 12.

In a first step, as is shown in FIG. 9, the polysilicon wiring 17 is provided in the vertical direction for each pixel on the glass substrate 10 of the array substrate 2. Subsequently, the entire array substrate 2 together with all the polysilicon wirings 17 is covered with the gate insulation film 16C formed of a film of silicon oxide, a film of silicon nitride, or the like.

In a second step, as is shown in FIG. 9, the gate lines 16 in the horizontal direction, the gate electrode branch lines 16A branched from the gate lines 16 in the vertical direction, the first metal lines 16B in the vertical direction orthogonal to the gate lines 16, and the gate extraction lines 16D extracted in the vertical direction from the ends of the gate lines 16 are provided using a metal layer of molybdenum alloy or the like. Subsequently, the entire array substrate 2 together with these lines is covered with the first interlayer insulation film 15B formed of a film of silicon oxide, a film of silicon nitride, or the like.

Figure 10:
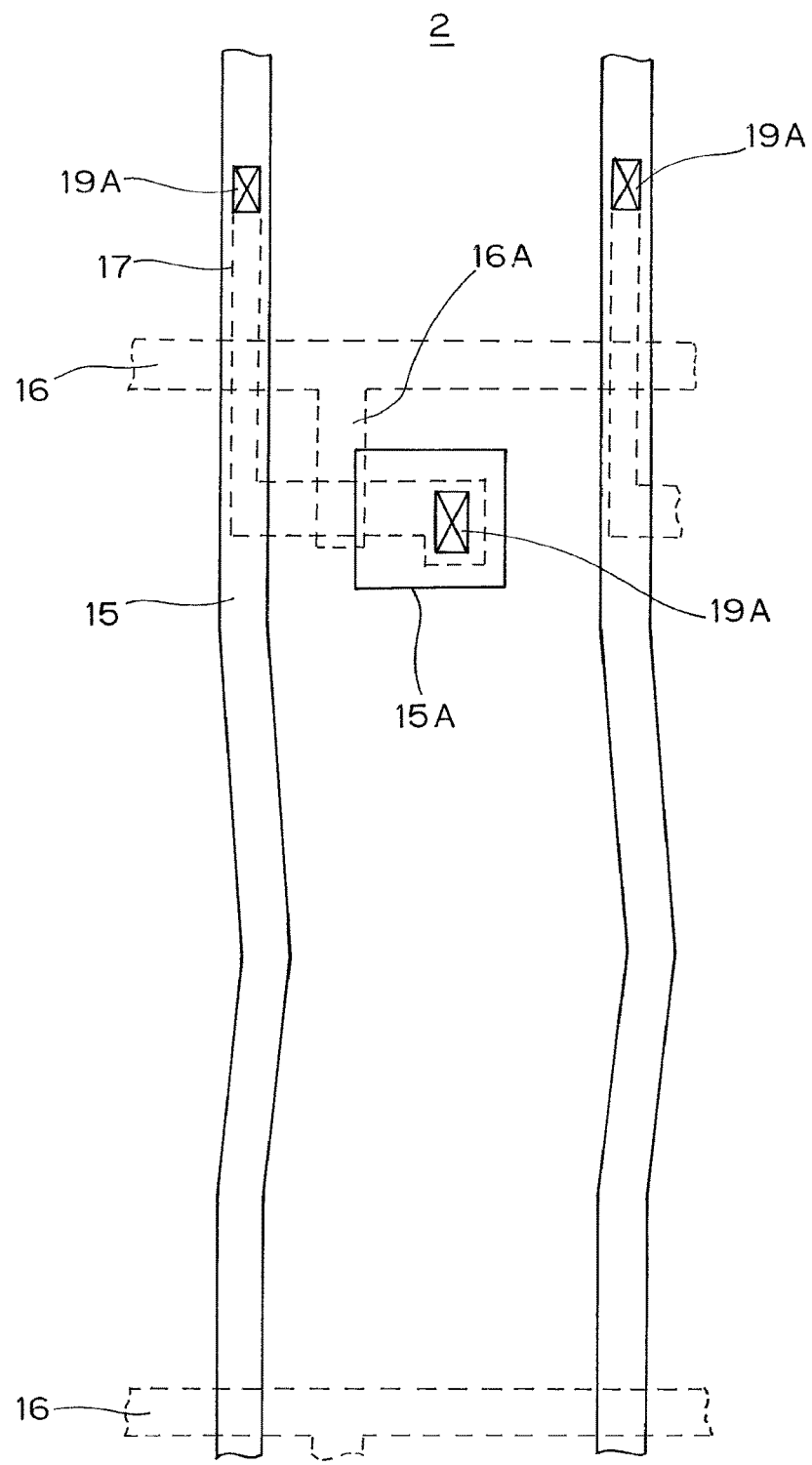
FIG. 10 is a plan view of the array substrate in a second step through fourth step.

In a third step, as is shown in FIG. 10, contact holes 19A through which to expose both ends of the respective polysilicon wires 17 are provided to penetrate through the first interlayer insulation film 15B and the gate insulation film 16C.

In a fourth step, as is shown in FIG. 10, the signal lines 15, which are a second metal line, are provided on the first interlayer insulation film 15B above the first metal lines 16B using metal, such as aluminum or alloy of aluminum. At a same time, a first insular pattern 15A is provided to the switching element 32. In order to make the array protrusion 11 relatively high, it is preferable to form the signal lines 15 thicker than the gate lines 16. For example, a thickness of the signal lines 15 is 0.1 to 0.3 μm.

In a fifth step, the transparent organic insulation film 12 including the array protrusions 11 is provided to cover the signal lines 15 and the first insular patterns 15A. Subsequently, a contact hole 19B through which to expose a part of the first insular pattern 15A is provided. A thickness of the organic insulation film 12 is, for example, 0.5 to 2 μm, and more preferably, 0.8 to 1.2 μm.

Figure 11:
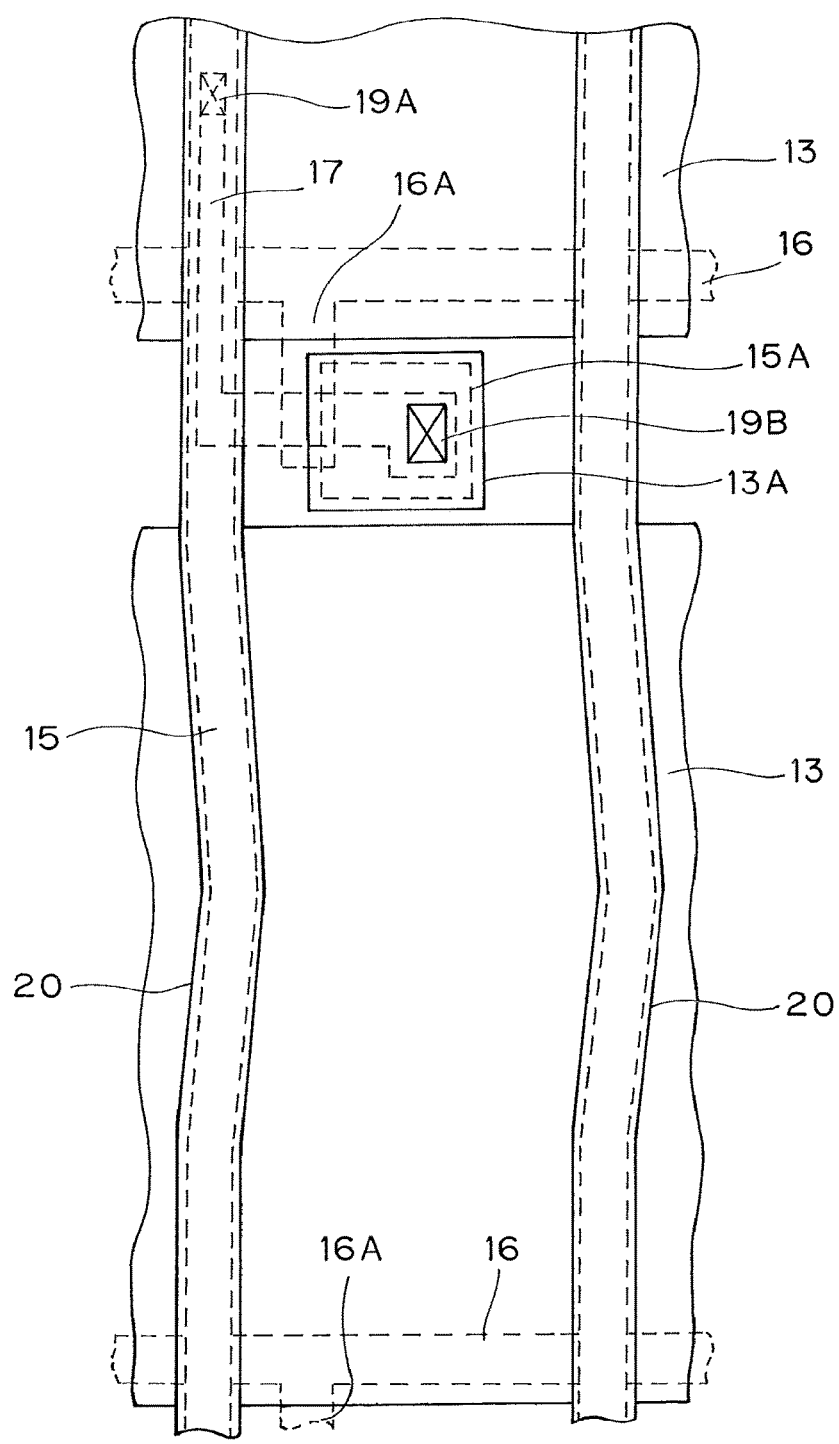
FIG. 11 is a plan view of the array substrate in a sixth step through an eighth step.

In a sixth step, as is shown in FIG. 11, the common electrodes 13 made of a transparent conductive material, such as ITO and IZO, are provided on the organic insulation film 12. At a same time, a second insular pattern 13A is provided to the switching element 32. A thickness of the common electrodes 13 is, for example, 10 to 30 nm (0.01 to 0.03 μm).

In a seventh step, as is shown in FIG. 11, the common lines 20, which are a third metal line, are provided on the common electrodes 13 above the signal lines 15. The common electrodes 13 are electrically interconnected via the common lines 20.

Figure 12:
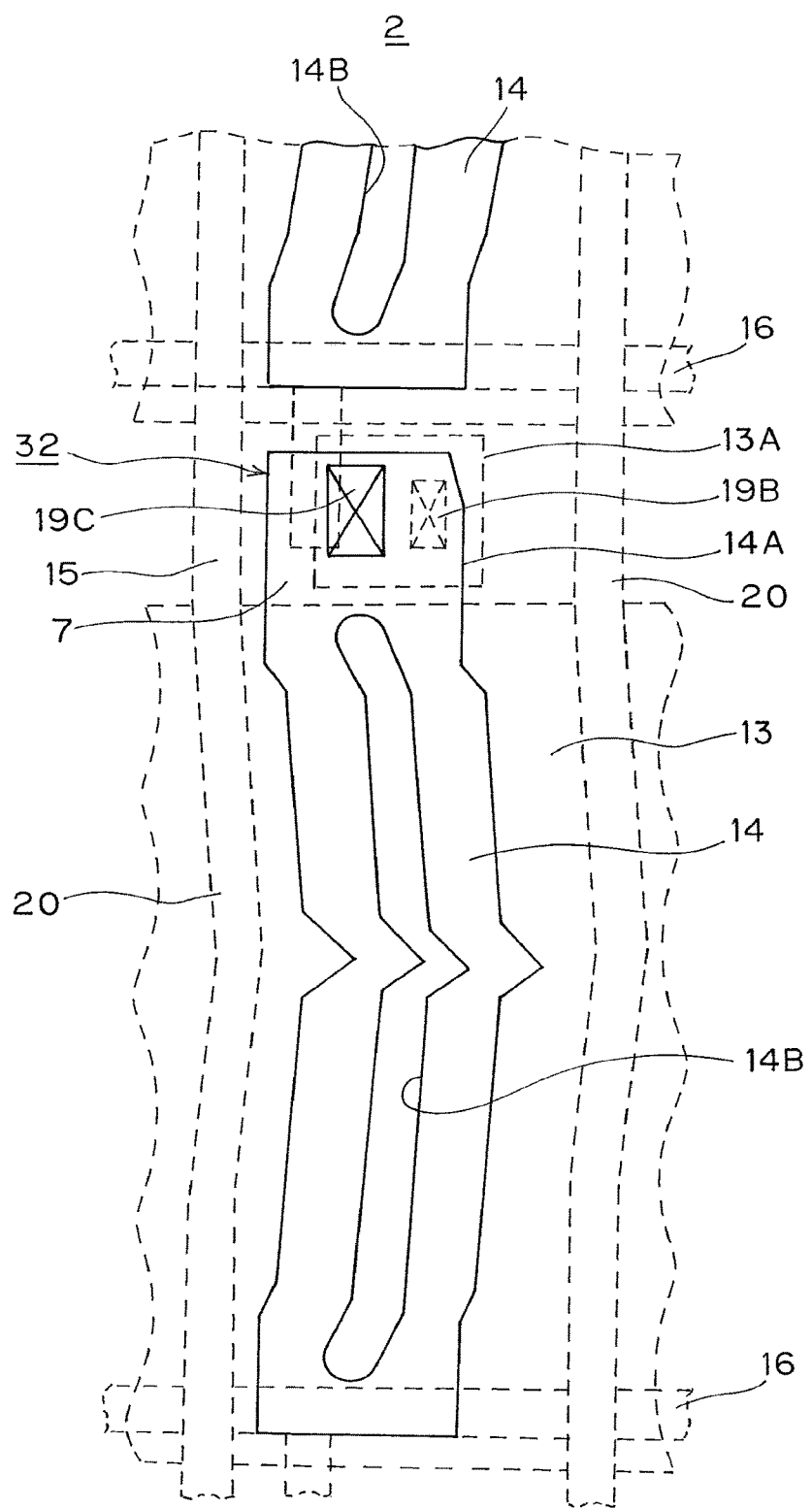
FIG. 12 is a plan view of the array substrate in a ninth step.

In an eighth step, as is shown in FIG. 12, the second interlayer insulation film 133 covering the common electrodes 13, the common lines 20, and so on is provided to the entire array substrate 2. Subsequently, a contact hole 19C through which to expose a part of the second insular pattern 13A is provided.

In a ninth step, as is shown in FIG. 12, the pixel electrodes 14 made of a transparent conductive material, such as ITO and IZO, are provided. The slit 14B is provided to the pixel electrode 14 along the signal lines 15. A thickness of the pixel electrodes 14 is, for example, 10 to 30 nm (0.01 to 0.03 μm).

In a tenth step, the oriented film 18 made of resin is provided to the entire array substrate 2, followed by photo-alignment with ultraviolet irradiation.

7. Manufacturing Process of Counter Substrate 3

A manufacturing process of the counter substrate 3 will be described briefly.

In a first step, as is shown in FIG. 2, the black matrix 102 formed of a resin layer in which a black pigment is dispersed or a metal layer is provided on the glass substrate 100 of the counter substrate 3.

In a second step, three color filter layers 104R, 104B, and 104G formed of resin layers in which a pigment of red represented by R, a pigment of blue represented by B, and a pigment of green represented by G are dispersed, respectively, are provided one by one.

In a third step, the overcoating layer 106 is provided to eliminate irregularities in thickness and projection and depression among the color filter layers 104R, 104B, and 104G. The counter protrusions 108 may be provided simultaneously with the overcoating layer 106 using a halftone exposure technique. As is shown in FIG. 2, the counter protrusion 108 is provided at a position from the signal line 15 to the switching element 32 along the gate line 16 in the horizontal direction. A thickness of the overcoating layer 106 is, for example, 0.5 to 2 μm, more preferably, 0.8 to 1.2 μm.

In a fourth step, the oriented film 110 made of resin is provided to the overcoating layer 106 and the counter protrusions 108, followed by photo-alignment with ultraviolet irradiation.

8. Effects

According to the present embodiment, because the outer periphery of the seal member 5 is blocked by the array wall protrusion 40 and the counter wall protrusion 124, the seal member 5 does not come out to the outer periphery. The seal member 5 does not flow out into the image display region, either, because the intrusion prevention wall 126 is present on the image display region side.

The liquid crystal display device is of a configuration in which a height of the first metal line 16B, the signal line 15, and the common line 20 laminated in three layers is added to a height of the array protrusion 11 of the array substrate 2, whereas the array wall protrusion 40 in the outer periphery does not have these metal lines laminated in three layers. Hence, a height of the array wall protrusion 40 (a protrusion distance from the glass substrate 10 to the top of the array wall protrusion 40) is less than a height of the array wall protrusion 11 (a protrusion distance from the glass substrate 10 to the top of the array protrusion 11) by a height of the three layers. In a case where the top of the counter protrusion 108 and the top of the counter wall protrusion 124 both protruding from the glass substrate 100 of the counter substrate 3 are of a same height (have equal protrusion distances) as in the related art, the outer periphery of the display panel 1 bends. In the present embodiment, by contrast, the counter wall protrusion 124 is provided at a location where the first wall color filter layer 116 and the second wall color filter layer 118 are laminated in the outer periphery. Hence, a protrusion distance from the glass substrate 100 to the top of the counter wall protrusion 124 becomes longer than a protrusion distance from the glass substrate 100 to the top of the counter protrusion 108. Consequently, the outer periphery of the display panel 1 does not bend even when the top of the counter wall protrusion 124 makes contact with the top of the lower array wall protrusion 40 (having the shorter protrusion distance).

In addition, the first BM groove 112 and the second BM groove 114 are provided along the four sides of the counter substrate 3. Hence, when the large-scale substrate is cut into individual display panels 1, electrification during the cutting can be prevented by the first BM groove 112.

Further, the light-shielding color filter layer 120 and the light-shielding color filter layer 122 are laminated in the second BM groove 114. Hence, in addition to electrification during the cutting, passing of light through the second BM groove 114 can be also prevented. More specifically, because the second BM groove 114 is located close to the image display region, light may possibly pass through the second BM groove 114. However, light can be prevented from passing through the second BM groove 114 by laminating the light-shielding color filter layer 120 and the light-shielding color filter layer 122.

By providing the common lines 20 on the signal lines 15, a parasitic capacity can be reduced.

A thickness in the neighborhood of the signal lines 15 is increased by providing the array protrusions 11. Hence, not only can the signal lines 15 be covered and insulated in a reliable manner, but also a parasitic capacity between the signal lines 15 and a conductive layer on the organic insulation film 12 can be reduced sufficiently.

The present embodiment also achieves an effect unique to a liquid crystal display device of a horizontal field type, such as the IPS method. More specifically, as is shown in FIG. 3, a looped line 8 of electric force extends from the array substrate 2 due to a liquid crystal drive voltage applied between the common electrode 13 and the pixel electrode 14. However, as is schematically shown in FIG. 3, the presence of the array protrusion 11 restricts the looped line 8 of electric force from extending to a vicinity of the signal lines 15 on the right and left.

In addition, the array protrusion 11 in the vertical direction and the counter protrusion 108 in the horizontal direction make contact with each other in a cross shape when viewed in a plan view. Hence, there is no possibility that the counter protrusion 108 or the array protrusion 11 damages the other substrate 2 or 3 by making contact at any other location than the corresponding protrusion. The counter protrusion 108 can be provided simultaneously and integrally with the overcoating layer 106 with a protrusion dimension less than a thickness of the liquid crystal layer 4. Hence, a process burden can be reduced.

Second Embodiment

Figure 13:
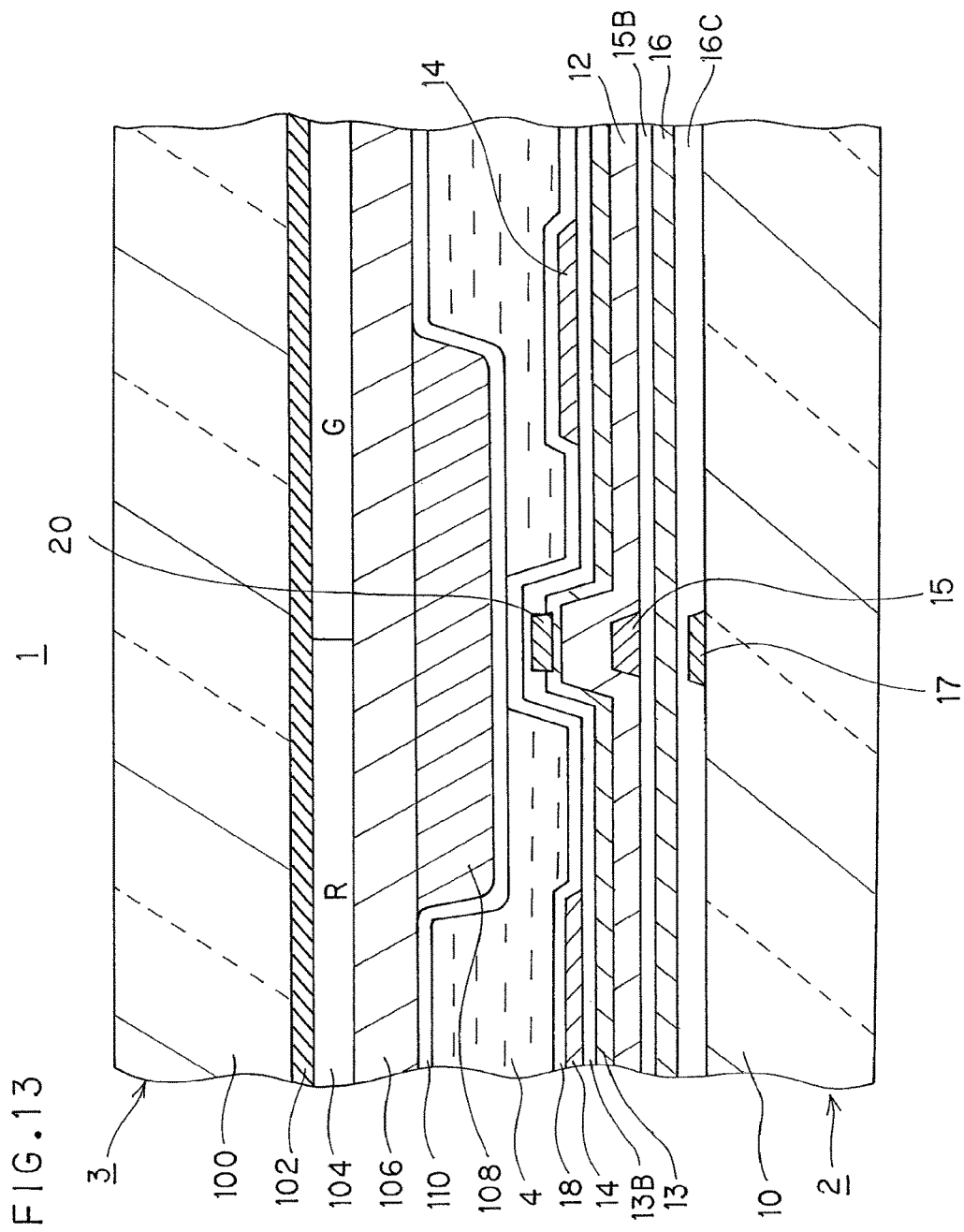
FIG. 13 is a longitudinal sectional view of a display panel according to a second embodiment taken along a gate line.
Figure 14:
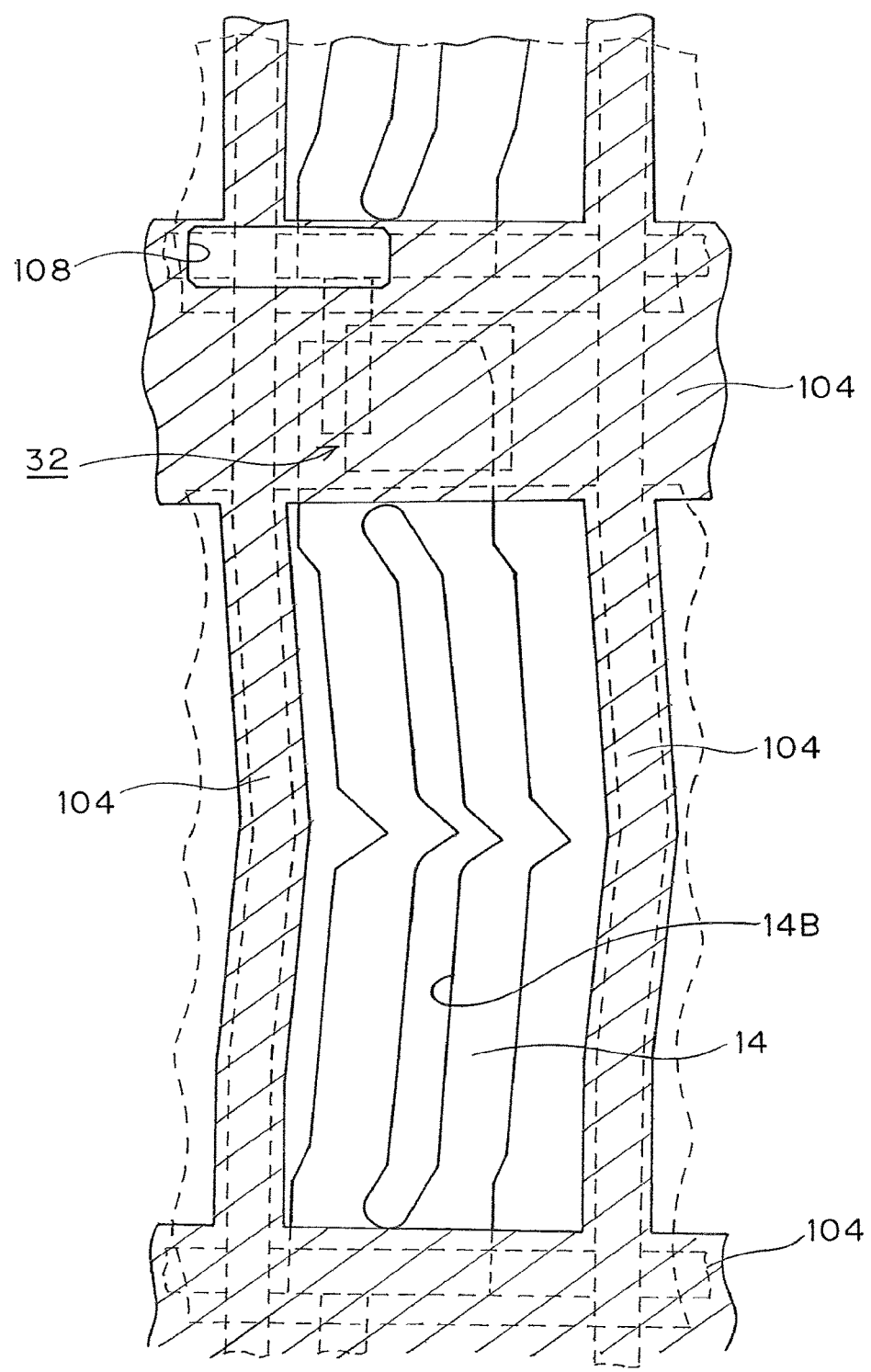
FIG. 14 is a plan view of an array substrate with a black matrix and a counter protrusion.

A display panel 1 of a liquid crystal display device according to a second embodiment will now be described according to FIG. 13 and FIG. 14.

A difference of the present embodiment from the first embodiment above is a location of a counter protrusion 108 provided to a counter substrate 3. In the first embodiment above, as is shown in FIG. 2, the counter protrusion 108 is provided from the signal line 15 to the switching element 32 along the gate line 16 in the horizontal direction. In the present embodiment, by contrast, as is shown in FIG. 14, the counter protrusion 108 is provided directly above the gate line 16 along a direction of the gate line 16.

In the present embodiment, too, an array protrusion 11 provided along the signal line 15 and the counter protrusion 108 are orthogonal to each other and make contact in a cross shape. Hence, the array protrusion 11 and the counter protrusion 108 can function as a pillar-like spacer.

Third Embodiment

Figure 15:
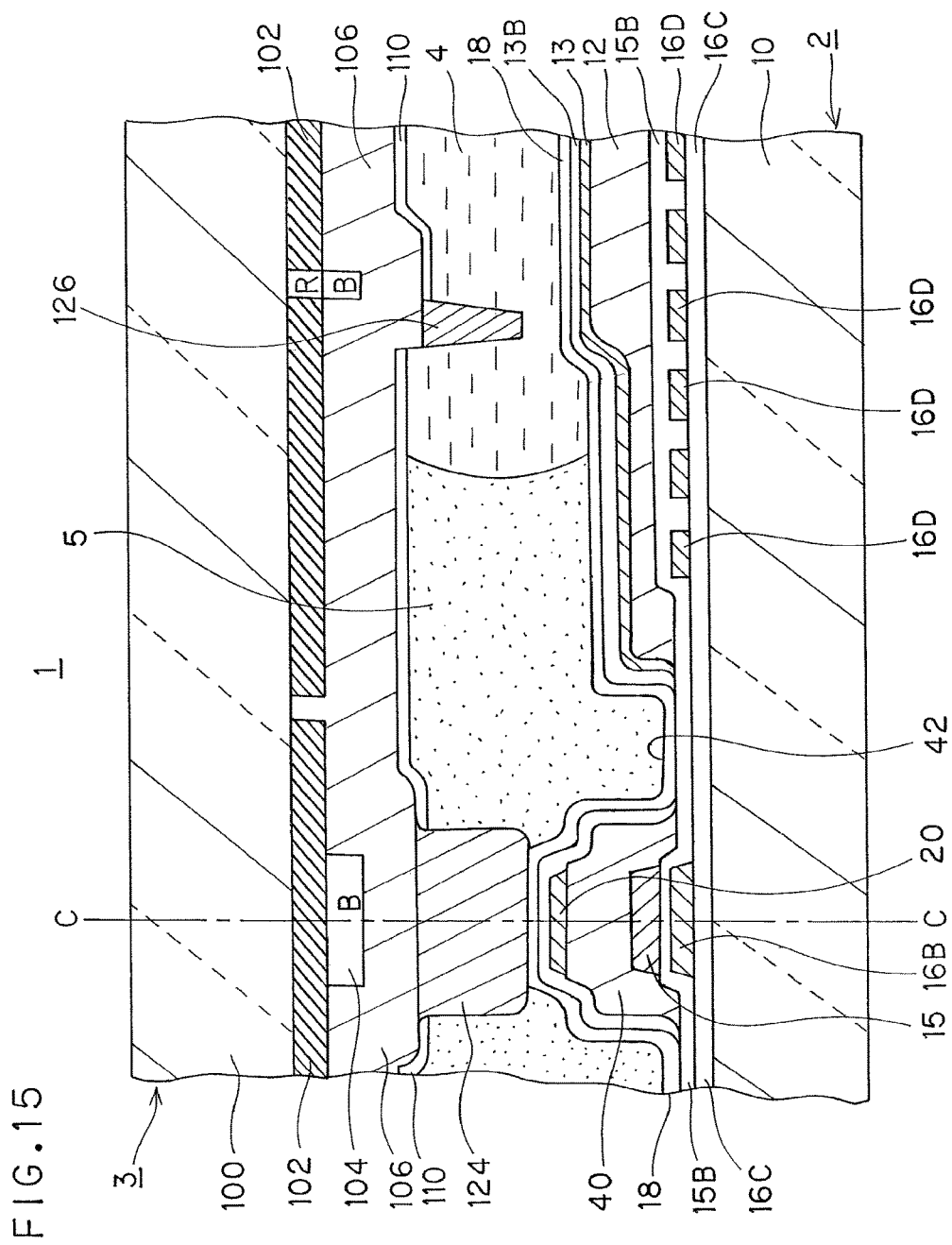
FIG. 15 is a longitudinal sectional view of an outer periphery of a display panel according to a third embodiment.

A display panel 1 of a liquid crystal display device according to a third embodiment will now be described according to FIG. 15. A difference of the present embodiment from the first embodiment above is an outer periphery of the display panel 1.

In the present embodiment, only one color filter layer 104 is provided to a black matrix 102 of a counter substrate 3 to make a protrusion distance from a glass substrate 100 to a counter protrusion 108 and a protrusion distance from the glass substrate 100 to a counter wall protrusion 124 equal.

Meanwhile, regarding an array substrate 2, as with an array protrusion 11, an array wall protrusion 40 includes a first metal line 16B, a second metal line 15, and a third metal line 20 made of same materials and provided in same layers as a gate line 16, a signal line 15, and a common line 20, respectively. These metal lines 16B, 15, and 20 are floated from other conductive layers. An end side surface of the array wall protrusion 40 and an end side surface of a glass substrate 10 are flush with each other. As in the first embodiment above, the first metal line 16B, the second metal line 15, and the third metal line 20 are provided along three sides of the array substrate 2 except for one side where a terminal is provided.

According to the present embodiment, a protrusion distance from the glass substrate 10 to a top of the array wall protrusion 40 and a protrusion distance from the glass substrate 10 to a top of the array protrusion 11 become equal. Hence, even when a top of the counter protrusion 108 and a top of the counter wall protrusion 124 both protruding from the glass substrate 100 of the counter substrate 3 are of a same height as in the related art, an outer periphery of the display panel 1 does not bend.

Fourth Embodiment

A display panel 1 of a liquid crystal display device according to a fourth embodiment will now be described according to FIG. 16. A difference of the present embodiment from the third embodiment above is shapes of a first metal line 16B, a second metal line 15, and a third metal line 20 provided in an array wall protrusion 40. That is, in the array wall protrusion 40 of the third embodiment above, the first metal line 16B, the second metal line 15, and the third metal line (common line) 20 become exposed to the outer periphery when a large-scale substrate is cut.

Figure 16:
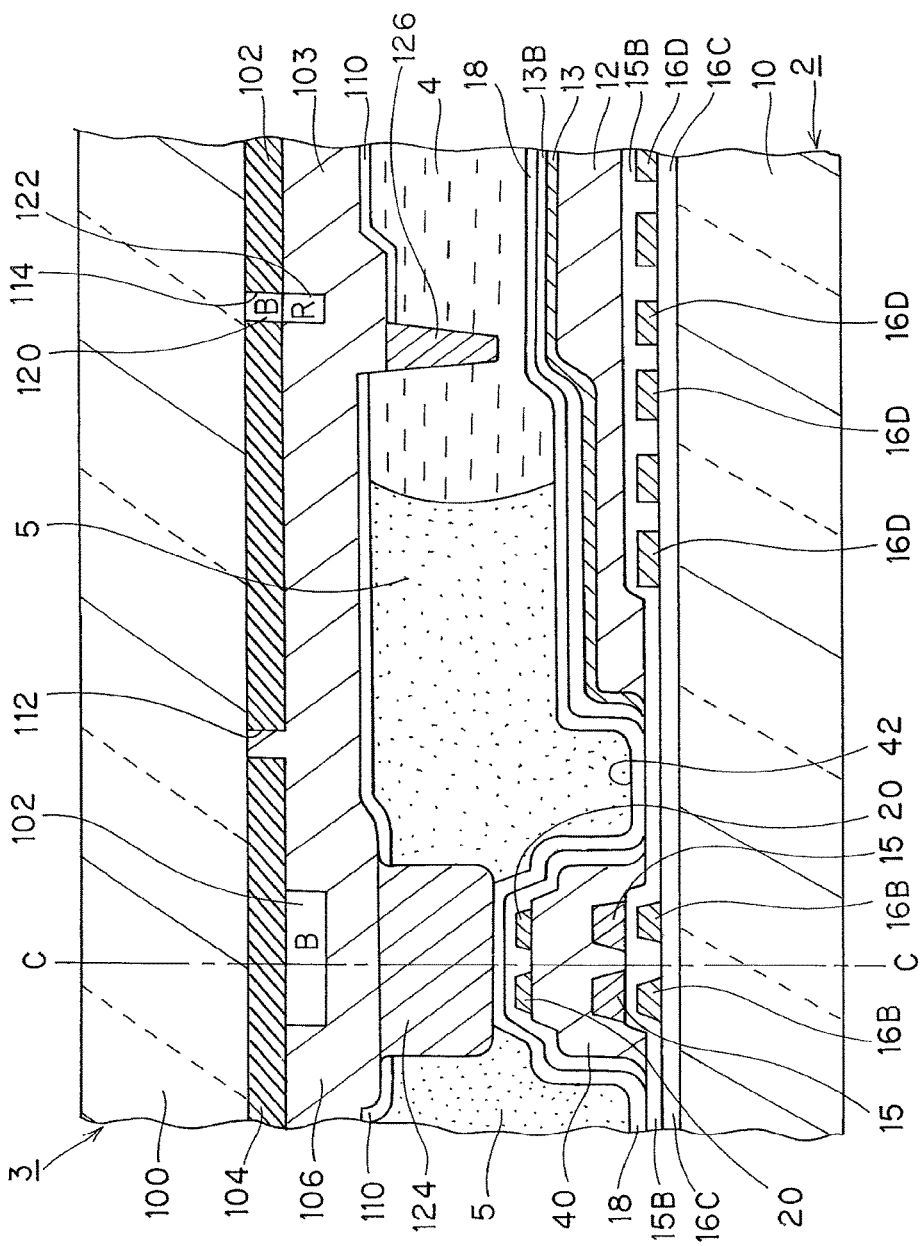
FIG. 16 is a longitudinal sectional view of an outer periphery of a display panel according to a fourth embodiment.

In order to prevent exposure of such a metal segment, as is shown in FIG. 16, two parallel first metal lines 16B and 16B, two parallel second metal lines 15 and 15, and two parallel third metal lines 20 and 20 are provided to avoid a position along the cut line C-C in the present embodiment. These metal lines 16B, 15, and 20 are floated from other conductive layers.

According to the present embodiment, even when the large-scale substrate is cut into individual display panels 1, the metal segment does not become exposed at an end of each display panel 1.

Fifth Embodiment

Figure 17:
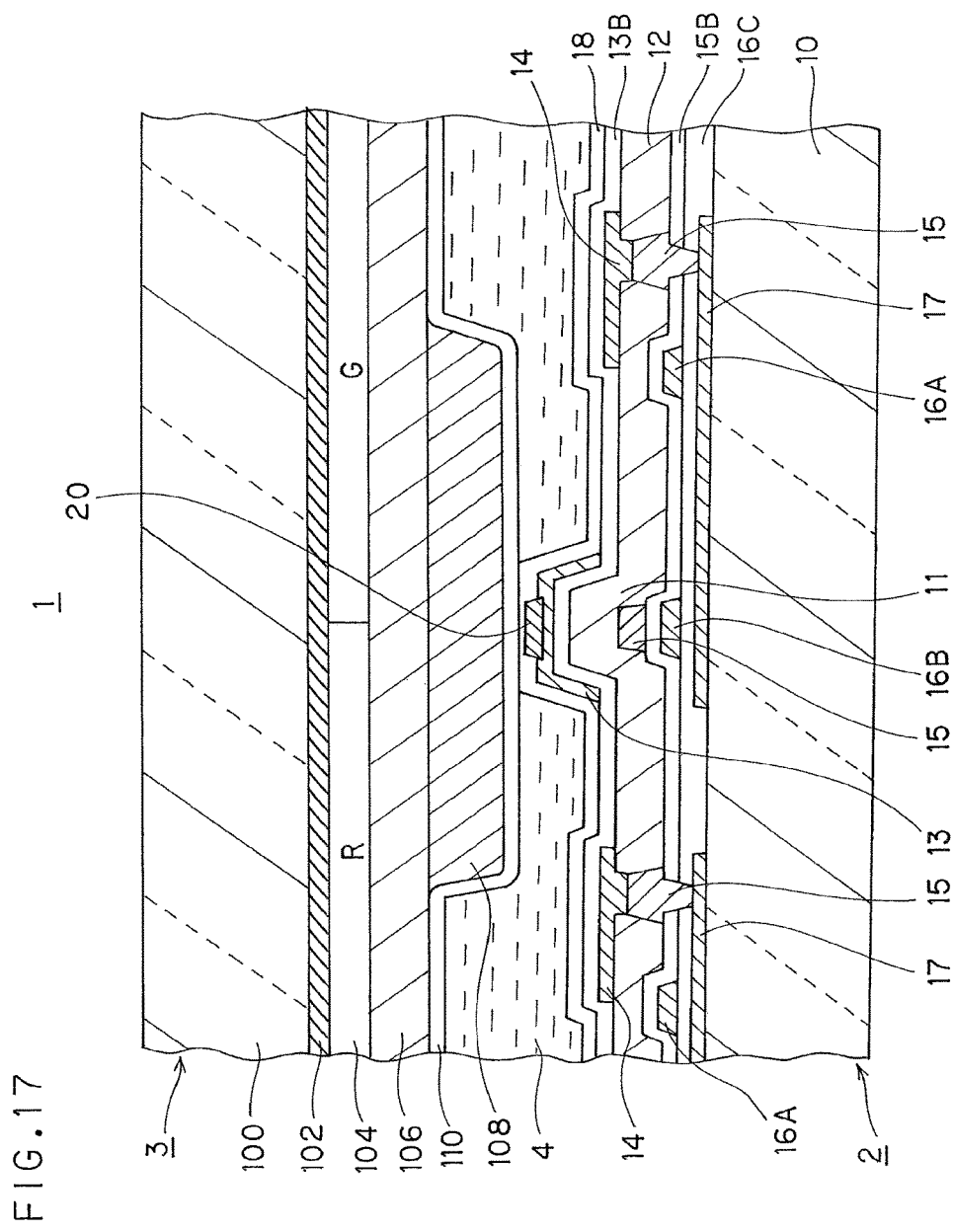
FIG. 17 is a longitudinal sectional view in a vicinity of a switching element according to a fifth embodiment.
Figure 18:
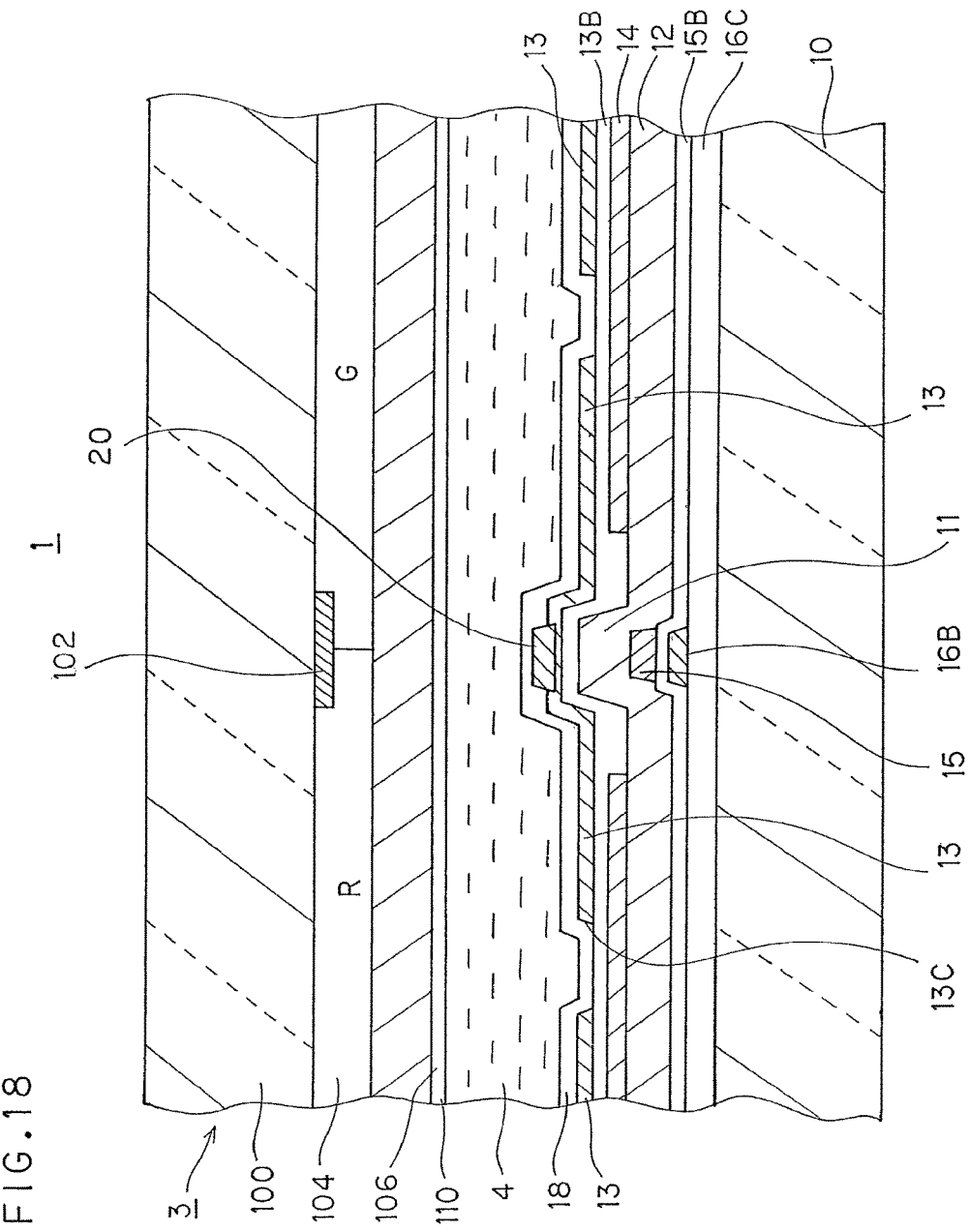
FIG. 18 is a longitudinal sectional view of a pixel electrode.

A display panel 1 of a liquid crystal display device according to a fifth embodiment will now be described according to FIG. 17 and FIG. 18.

In the first embodiment above, the pixel electrode 14 is provided on the common electrode 13. In the present embodiment, by contrast, as are shown in FIG. 17 and FIG. 18, a second interlayer insulation film 13B is provided on a pixel electrode 14 and a common electrode 13 is provided on the second interlayer insulation film 13B. A common line 20 is provided to the common electrode 13 at a position corresponding to an array protrusion 11, and an oriented film 18 is provided on the common line 20. In the present embodiment, a slit 14B is not provided to the pixel electrode 14 and a slit 13C is provided to the common electrode 13 instead.

In the present embodiment, too, the array protrusion 11 can be of a triple-layer structure including a first metal line 16B, a signal line 15, and the common line 20.

Modifications

While the above embodiments have described an IPS liquid crystal display device, it should be appreciated that an effect of preventing a mixed color can be obtained even when a liquid crystal display device adopts other types of horizontal field method. Even when a liquid crystal display device is of a type in which a common electrode (counter electrode) is provided to a counter substrate, an effect of preventing a mixed color can be obtained by increasing a critical angle of mixed color while making a liquid crystal layer thinner in a vicinity of a signal line.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a counter substrate including a first insulation substrate, a color filter layer on the first insulation substrate, an overcoating layer on the color filter layer, and a first protrusion and a second protrusion on the overcoating layer, wherein
the first protrusion is located in an image display region,
the second protrusion is located in a peripheral region enclosing the image display region,
the first protrusion and the second protrusion are of substantially a same height,
a first protrusion distance from the first insulation substrate to a top of the first protrusion is shorter than a second protrusion distance from the first insulation substrate to a top of the second protrusion,
a first layer of the color filter layer in the second protrusion has multiple slits each extending along an outer periphery of the counter substrate,
a second layer of the color filter layer in the second protrusion is laminated to fully cover the first layer of the color filter layer to get into the slits of the first layer, and
the slits of the first layer overlap the second protrusion.

2. The display device according to claim 1, wherein the second protrusion is provided to at least one side of the counter substrate.

3. The display device according to claim 2, wherein the second protrusion is provided linearly along the one side.

4. The display device according to claim 2, wherein the second protrusion is provided linearly along each of three sides of the counter substrate.

5. The display device according to claim 1, further comprising a black matrix between the first insulation substrate and the color filter layer, wherein
a thickness of the black matrix in the image display region and a thickness of the black matrix in the peripheral region are substantially equal,
the overcoating layer directly covers the second layer in the second protrusion, and
the second layer is in contact with the black matrix in the slits.

6. The display device according to claim 5, wherein an end side surface of the first insulation substrate, an end side surface of the black matrix, an end side surface of the first layer of the color filter layer in the second protrusion, an end side surface of the second layer of the color filter layer in the second protrusion, and an end side surface of the second protrusion are flush with one another.

7. The display device according to claim 1, further comprising a black matrix between the color filter layer and the first insulation substrate, wherein
the black matrix has a first groove and a second groove in the peripheral region,
the second groove is between the image display region and the first groove,
the overcoating layer is filled in the first groove, and
the color filter layer is filled in the second groove.

8. The display device according to claim 7, wherein
the color filter layer in the second groove has a first color layer and a second color layer laminated on the first color layer,
the first color layer is sandwiched by the first insulation substrate and the second color layer in the second groove, and
a height of the color filter layer in the second groove is higher than a height of the second groove.

* * * * *